US011027907B2

(12) United States Patent
Hoyt

(10) Patent No.: US 11,027,907 B2
(45) Date of Patent: Jun. 8, 2021

(54) CONTAINER WITH CLOSURES

(71) Applicant: Scott Hoyt, La Crescent, MN (US)

(72) Inventor: Scott Hoyt, La Crescent, MN (US)

(73) Assignee: Eufouric Brands, LLC, Baxter, MN (US)

( * ) Notice: Subject to any disclaimer, the term of this patent is extended or adjusted under 35 U.S.C. 154(b) by 222 days.

(21) Appl. No.: 16/314,409

(22) PCT Filed: Jun. 29, 2017

(86) PCT No.: PCT/US2017/040092
§ 371 (c)(1),
(2) Date: Dec. 29, 2018

(87) PCT Pub. No.: WO2018/005859
PCT Pub. Date: Jan. 4, 2018

(65) Prior Publication Data
US 2019/0152677 A1    May 23, 2019

Related U.S. Application Data

(60) Provisional application No. 62/356,043, filed on Jun. 29, 2016, provisional application No. 62/370,869, (Continued)

(51) Int. Cl.
*B65D 81/20* (2006.01)
*B65D 25/28* (2006.01)
(Continued)

(52) U.S. Cl.
CPC ..... *B65D 81/2038* (2013.01); *B65D 25/2885* (2013.01); *B65D 39/08* (2013.01);
(Continued)

(58) Field of Classification Search
CPC ............... B65D 81/3813; B65D 45/16; B65D 2543/00194; B65D 81/2038; B65D 81/3823; B65D 81/3818; B65D 2543/00481; B65D 2543/00537; F25D 3/08; F25D 2700/121
(Continued)

(56) References Cited

U.S. PATENT DOCUMENTS 1,490,575 A * 4/1924 Masury ................. E05B 83/243
292/80
3,503,535 A * 3/1970 Sparks, Sr. ........... B65F 1/1615
220/326
(Continued)

FOREIGN PATENT DOCUMENTS

JP          3177850 B2   6/2001
WO   WO2006009537 A1   1/2006
WO   WO2015042841 A1   4/2015

*Primary Examiner* — Ernesto A Grano
(74) *Attorney, Agent, or Firm* — Skaar Ulbrich Macari, P.A.; Gregory L. Koeller

(57) ABSTRACT

A container having a full perimeter lid pressure or tensioning mechanism. The container can also have a removable temperature sensor to monitor an internal compartment temperature. A pressure regulator is also disclosed to regulate a pressure differential and vacuum of the container in order to control an amount of vacuum sealing of the lid to the container.

12 Claims, 14 Drawing Sheets

Related U.S. Application Data filed on Aug. 4, 2016, provisional application No. 62/403,517, filed on Oct. 3, 2016.

(51) Int. Cl.
  *B65D 39/08* (2006.01)
  *B65D 81/38* (2006.01)
  *B65D 43/16* (2006.01)
  *B65D 45/16* (2006.01)
  *B65D 51/24* (2006.01)
  *G01K 1/14* (2021.01)
  *F25D 3/08* (2006.01)

(52) U.S. Cl.
  CPC .......... *B65D 43/165* (2013.01); *B65D 45/16* (2013.01); *B65D 51/24* (2013.01); *B65D 81/3813* (2013.01); *B65D 81/3818* (2013.01); *B65D 81/3823* (2013.01); *G01K 1/14* (2013.01); *B65D 2543/0049* (2013.01); *B65D 2543/00194* (2013.01); *B65D 2543/00296* (2013.01); *B65D 2543/00314* (2013.01); *B65D 2543/00537* (2013.01); *B65D 2543/00555* (2013.01); *B65D 2543/00972* (2013.01); *F25D 3/08* (2013.01); *G01K 2207/04* (2013.01)

(58) Field of Classification Search
  USPC ...................................................... 206/459.1
  See application file for complete search history.

(56) References Cited

U.S. PATENT DOCUMENTS

| | | | | |
|---|---|---|---|---|
| 3,782,765 A * | 1/1974 | Wallyn | ................... | E05C 19/10 292/103 |
| 4,863,394 A | 9/1989 | Glomski | | |
| D333,775 S * | 3/1993 | Krape | ........................... | D8/331 |
| 6,244,066 B1 | 6/2001 | LaRose | | |
| 6,398,272 B1 * | 6/2002 | Plummer | ............... | E05C 19/06 292/246 |
| D602,347 S * | 10/2009 | Allen | .......................... | D8/382 |
| D712,720 S * | 9/2014 | Seiders | ............ | B65D 81/3813 D8/343 |
| 8,875,934 B2 * | 11/2014 | Deka | ................... | B65D 81/3823 220/592.25 |
| D750,953 S * | 3/2016 | Jacobsen | ........................ | D8/331 |
| D826,027 S * | 8/2018 | Carey | ........................... | D8/331 |
| 10,138,047 B2 * | 11/2018 | Seiders | ............. | B65D 81/3823 |
| D836,995 S * | 1/2019 | Carey | ........................... | D7/605 |
| D870,520 S * | 12/2019 | Carey | ........................... | D7/605 |
| 10,538,365 B2 * | 1/2020 | Wood | ................. | E05B 65/5276 |
| D883,752 S * | 5/2020 | Carey | ........................... | D7/605 |
| 10,687,606 B1 * | 6/2020 | Nicks, III | ................ | A45F 4/02 |
| 10,689,157 B2 * | 6/2020 | Morine | .................. | A47G 23/02 |
| 10,843,863 B2 * | 11/2020 | Morine | .................. | B65D 43/16 |
| 2005/0178770 A1 * | 8/2005 | Hase | .................. | B65D 81/3818 220/592.2 |
| 2006/0032860 A1 * | 2/2006 | Hase | .................. | B65D 21/0223 220/831 |
| 2007/0235486 A1 | 10/2007 | Bernard | | |
| 2008/0110892 A1 * | 5/2008 | House | .................. | A01C 15/006 220/324 |
| 2014/0252010 A1 | 9/2014 | Miller | | |
| 2016/0251124 A1 * | 9/2016 | Arnold | ................ | B65D 43/162 220/324 |
| 2016/0279840 A1 * | 9/2016 | French | ............... | B65D 81/3816 |
| 2017/0313492 A1 * | 11/2017 | Seiders | .................. | B65D 81/30 |
| 2018/0015938 A1 * | 1/2018 | DeFrancia | ............... | B62B 5/067 |
| 2018/0080700 A1 * | 3/2018 | Cooper | ..................... | F25D 3/08 |
| 2018/0141718 A1 * | 5/2018 | Ahlstrom | ........... | B65D 25/2841 |

* cited by examiner

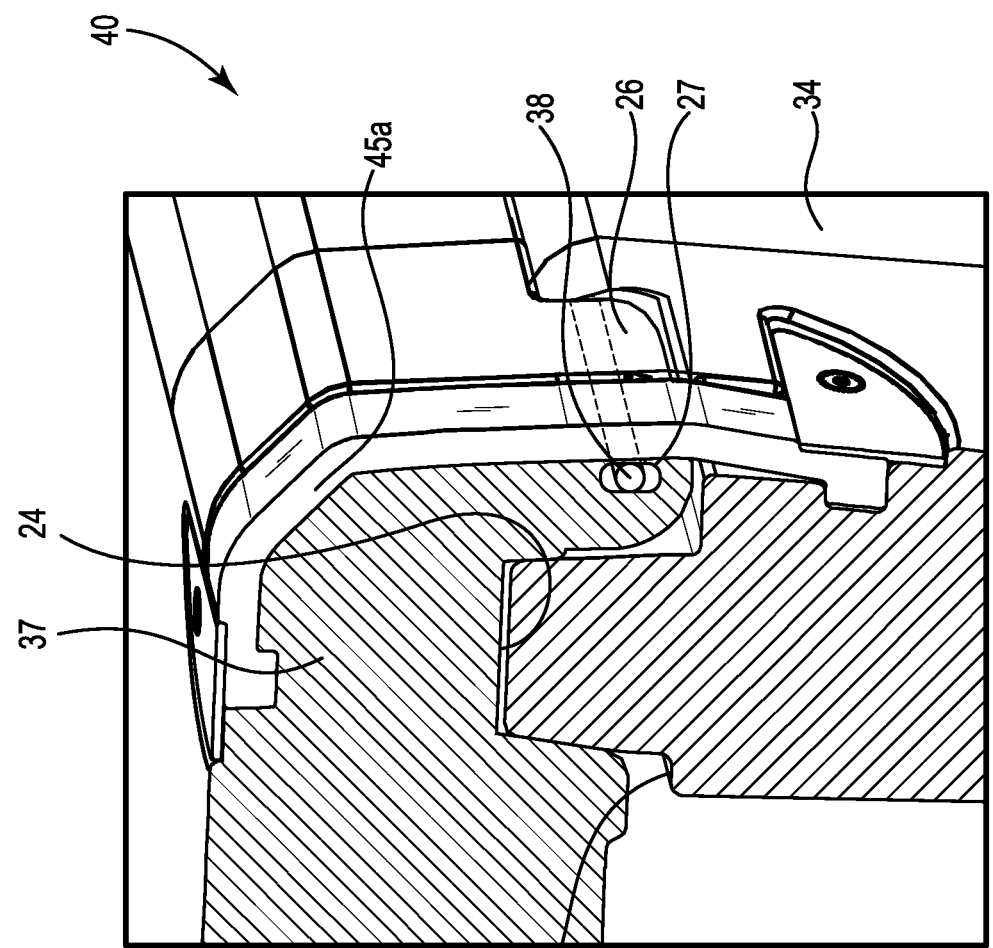
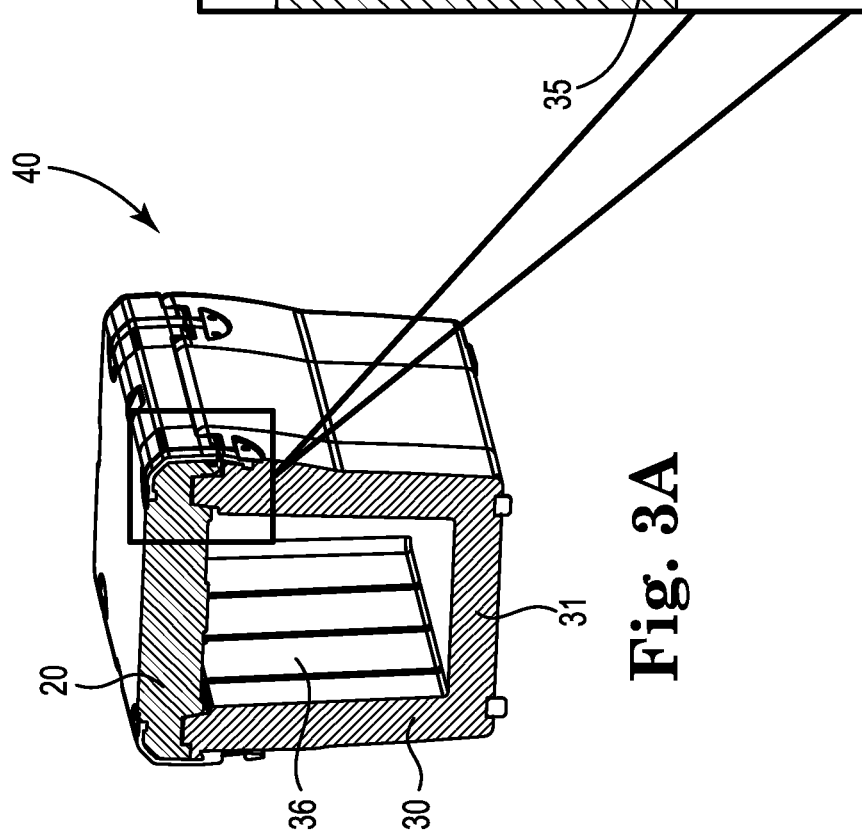
Fig. 3A
Fig. 3B

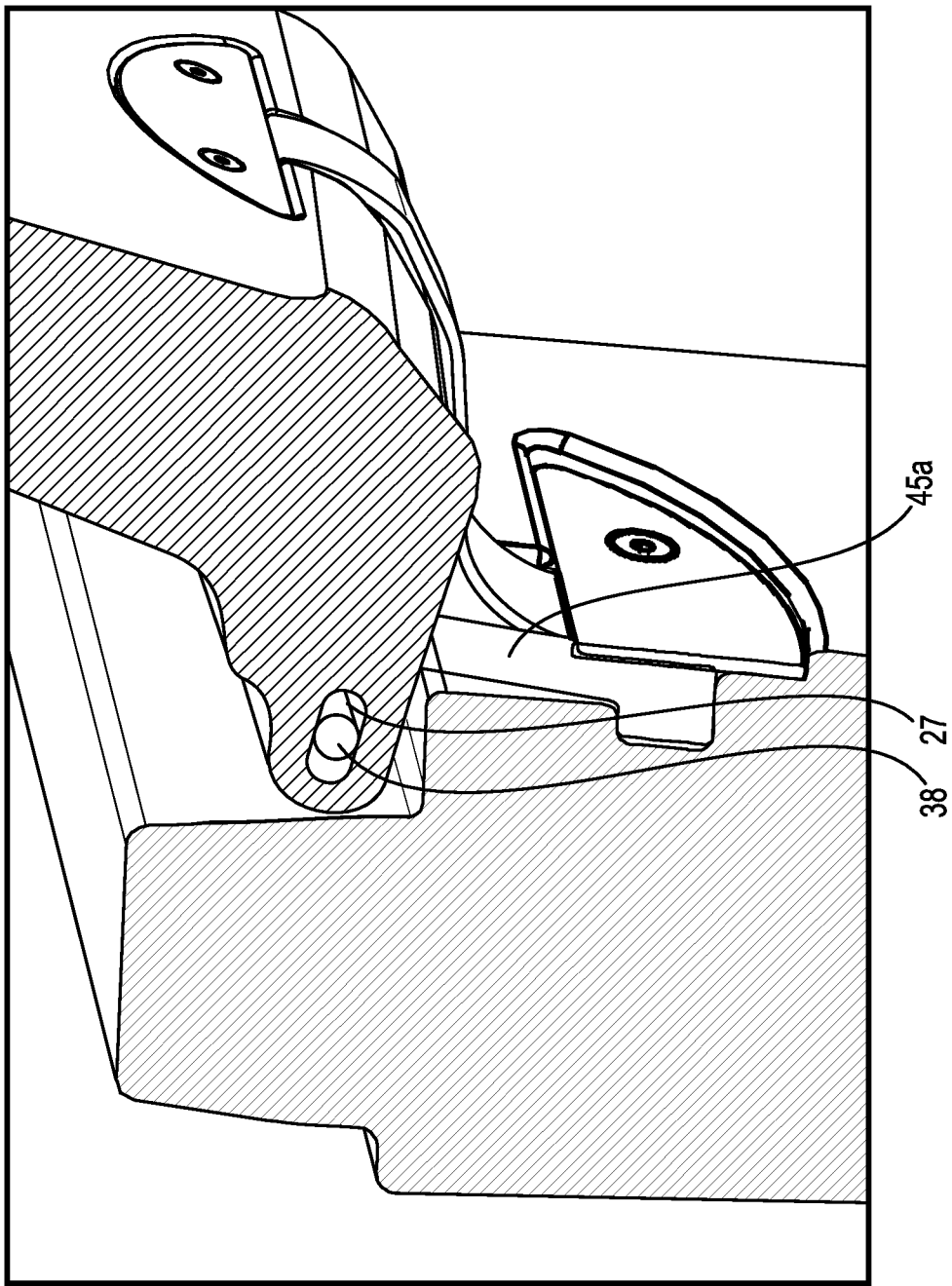

CONTAINER WITH CLOSURES

PRIORITY

This Application claims priority to and the benefit of U.S. Provisional Application No. 62/356,043 filed on Jun. 29, 2016, U.S. Provisional Application No. 62/370,869 filed on Aug. 4, 2016, and U.S. Provisional Application No. 62/403,517 filed on Oct. 3, 2016, all of which are hereby incorporated herein by reference in their entirety.

FIELD OF THE INVENTION

The present invention relates generally to containers and closures and, more specifically, to apparatus and methods of use for containers and closures having improved sealing capabilities.

BACKGROUND OF THE INVENTION

Containers with closures are typically used to store or transport items. Some containers, such as insulated containers, typically referred to coolers, chests, ice boxes, and the like, are generally used to transport or store food, beverages, and other perishables items above or below an ambient temperature. Insulated containers or coolers are typically used to regulate an interior temperature of the container. By regulating or controlling the interior temperature, the temperature of the container's contents can be raised, lowered, or maintained.

The interior temperature of an insulated container may be lowered below ambient temperature by adding thermal energy, such as ice, dry ice, cool packs, frozen food, and the like. The interior temperature may also be raised above an ambient temperature by adding pre-heated packs, warmed food or beverages, and the like.

Insulated containers create a thermal barrier between the inside and outside of the container. The quality, or performance of this thermal barrier will affect the duration of regulating the internal temperature with a given amount of thermal energy that has been added inside the container.

Conventional insulated containers also have the ability to maintain an item's temperature without the use of adding any type of external thermal energy, whether a cooling or heating source. The insulative properties of the container permit its interior to acclimate to and generally maintain a temperature of an item placed inside.

Conventional insulated containers do not have a means to monitor the interior temperature of the container. As a result, it is possible for perishable items to spoil due to an inability to monitor the internal temperature of the insulated container. What is needed is a device or means to monitor the internal temperature of an insulated container.

Insulated containers generally have a lid and base that seal together to create a thermal barrier for the contents inside from ambient temperatures outside. Effective thermal barriers have an air tight seal which can create a pressure differential inside and outside of the container because of changes in temperature, melting ice, and or altitude change while sealed. A pressure differential between the outside and inside of the insulated container, whereby the pressure inside the container is less than outside, can create a difficult experience for a user to open the container. Conventional insulated containers either do not have an aspect to equalize pressure, or they have a pressure release valve button that requires user intervention.

Conventional containers, including insulated containers, have lids that are hinged to a base. The conventional hinges, however, create lid pressure axially around a hinge pin. This hinging mechanism creates an uneven pressure on the outside and inside of the hinge, as well as uneven pressure and non-adjustable pressure relative to the latch side of the lid. As a result, a poor seal is formed that reduces the ability to maintain an interior temperature of the container.

There is a desire to have an insulated container that is capable of having its interior temperature monitored. There is also a desire to have an insulated container whereby it automatically reduces an internal vacuum to permit a user to more easily open a closure or lid of the container. There is also a desire for increased performance of the thermal barrier from uniform seal pressure between the closure or lid, and the base.

SUMMARY OF THE INVENTION

The present invention describes devices and methods for containing contents in a container with a closure or lid. It also describes devices and method for insulated containers with closures or lids that are capable of insulating or maintaining the temperature of an interior compartment of an insulated container. By maintaining the temperature of the container's compartment, the temperature of any contents contained therein may also be regulated.

Embodiments of the invention generally include a container, including insulated containers, with a lid pivotably coupled to a base or body. The lid may be pivotably coupled by a floating hinge pin mechanism, tensioning members, and latch members that permits the lid to form an improved seal with the base or body.

Embodiments of the invention may also include a thermometer that is mountable or removably mounted in the insulated container to monitor an interior compartment of the container. The thermometer may also be able to monitor an external or ambient temperature. The thermometer can inform a user to adjust the temperature in the interior or compartment by adding or removing thermal energy cooling or heating devices such as ice or heat packs, as needed.

The present invention may also include a pressure regulator that can automatically maximize the vacuum within the interior compartment. The pressure regulator of the present invention automatically reduces a pressure differential that causes a vacuum formed in the container due to the pressure differential. The reduced vacuum in the interior compartment permits a user to more easily open the closure or lid of the container.

The above summary is not intended to limit the scope of the invention, or describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

BRIEF DESCRIPTION OF THE DRAWINGS

FIG. 3A shows a cross-sectional view of an container in accordance with embodiments of the present invention.

FIG. 3B shows a close-up of a lid hinge of FIG. 3A in accordance with embodiments of the present invention.

FIG. 4 shows a cross-sectional close-up view of a lid hinge in an opened position of an container in accordance with embodiments of the present invention.

Figure 1:
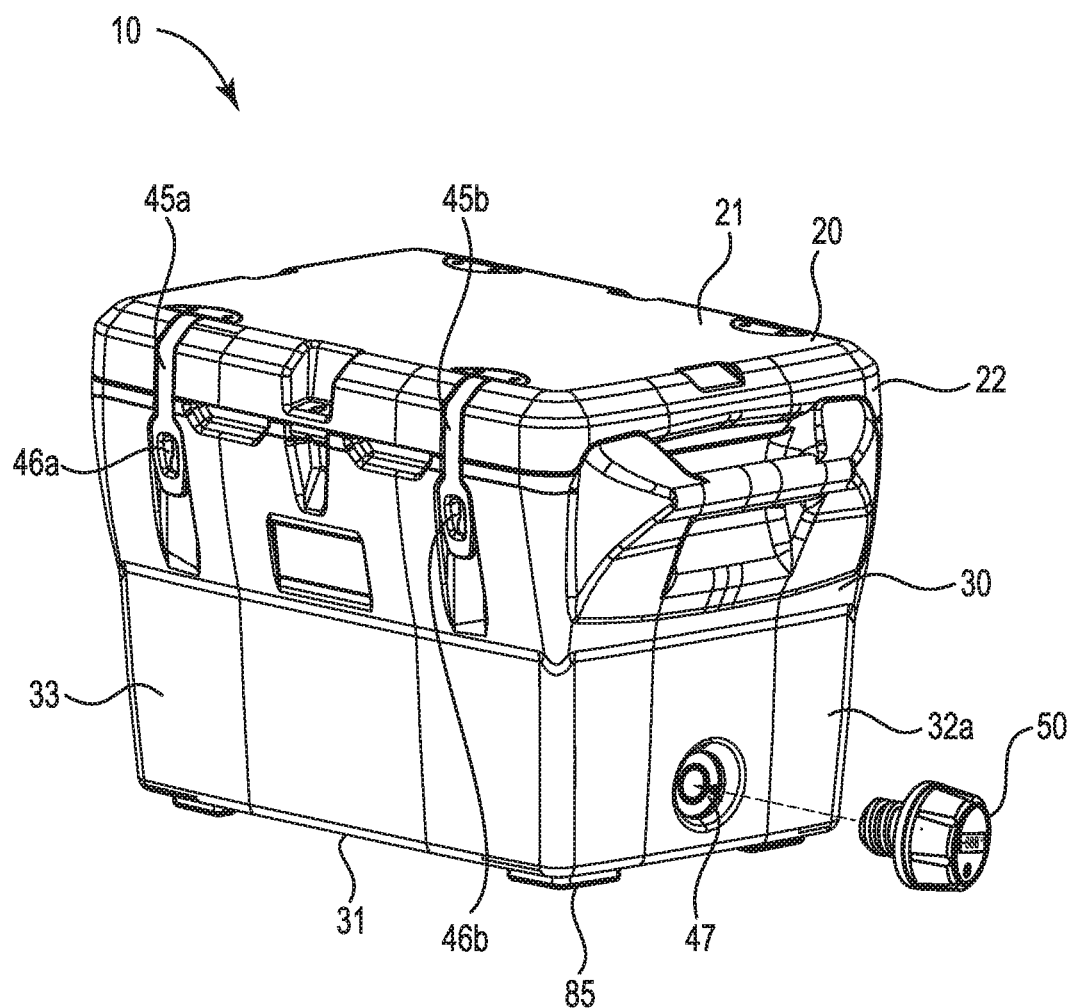
FIG. 1 shows a perspective view of an container having a lid and a base in accordance with embodiments of the present invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION OF PREFERRED EMBODIMENTS

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

Dimensions and relative proportions of components are merely example embodiments and can be varied unless specifically limited in a particular claim. Thus, the dimensions can be varied without departing from the scope of the invention.

Referring generally to FIGS. 1-14, various embodiments of a container 10 with a closure or lid 20 operatively mateable with a base or body 30 are disclosed. The various embodiments of the container 10 may also include a temperature monitor or sensor 50 to permit a user to monitor a temperature of an interior compartment 36 of the container 10. In another example embodiment of the present invention a pressure regulatory system or mechanism 70 may be provided to maximize an internal vacuum of the container 10 which permits a user to more easily open, unseal, or separate the closure or lid 20 from the base 30.

Figure 2:
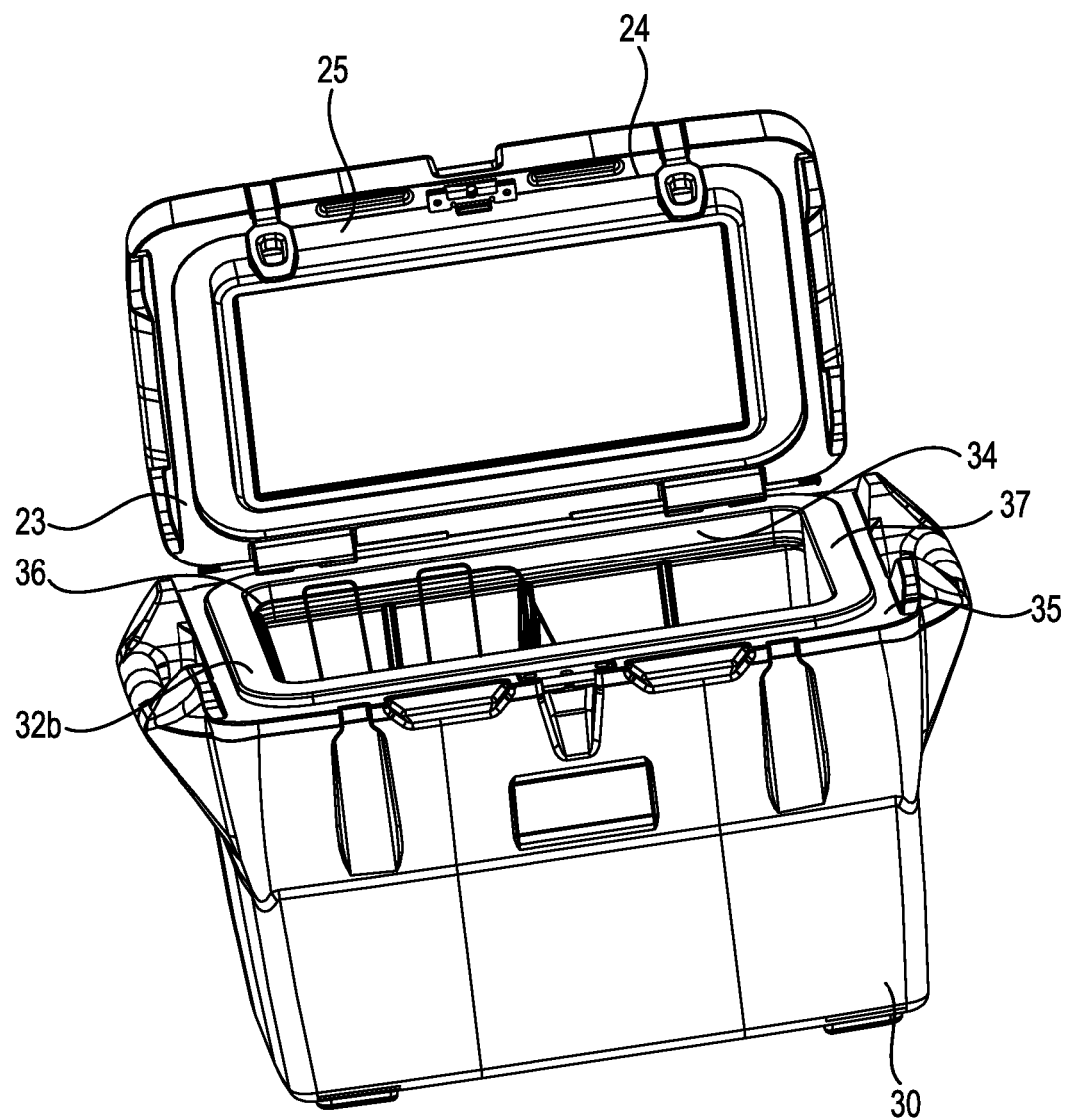
FIG. 2 shows a perspective view of an container with its lid in an open position in accordance with embodiments of the present invention.

As illustrated in FIG. 1, the lid or closure 20 of the container 10 has an upper surface 21, a peripheral or perimeter edge 22, and as illustrated in FIG. 2, a bottom surface 23. The bottom surface 23 of the lid or closure 20 is removably mateable with at least a portion of the base or body 30. The lid 20 may be manufactured from a molded material such as any suitable plastic and may take any shape or form. Therefore, the rectangular shape of the illustrated lid 20 should not be considered limiting.

As particularly illustrated in FIG. 2, the bottom surface 23 of the lid 20 may include one or more grooves 24 formed therein that is capable of mating with the base 30 to create a seal between the lid 20 and the base 30. Various groove 24 configurations are possible and the illustrations provided should not be considered limiting.

In another embodiment, the lid 20 may include a seal member or gasket 25 adhered or mounted thereto and capable of abutting a portion of the base or body 30 to form a seal. For example, the gasket 25 may be positioned on the bottom surface 23 of the lid 20 to abut or engage a lip 35 on the base 30. In another example embodiment, the gasket 25 can be mounted on a peripheral edge 22 of the lid 20 to engage an outer surface of the base 30. Other seal or gasket 25 configuration are possible and should be considered to be within the spirit and scope of the invention.

In embodiments of the invention having a seal member or gasket 25, the gasket 25 may be disposed on or in the groove 24 to provide a seal between the lid 20 and the base or body 30. The seal or gasket 25 is intended to prevent air or liquid from escaping or entering between the lid 20 and the base 30. By preventing the passage of air or liquid between the lid 20 and the base 30 an internal temperature is more easily maintained.

In embodiments of the invention having a seal or gasket 25, the gasket 25 may be manufactured from any generally pliable material such as rubber or silicon. Any material may be employed as a gasket provided it seals the junction between the lid 20 and the base 30. In lieu of a gasket 25, a portion of the lid 20 and/or base portion 30 that mate together may comprise a material that forms a seal when mated together.

As illustrated in FIGS. 1 and 2, the base 30 includes a bottom 31, generally opposed side walls 32A, 32B, and generally opposed front 33 and back 34 walls. The walls 32A-34 generally terminate in a lip 35 defining an opening into an interior compartment 36 of the base 30. The base 30 may take any form or shape and the rectangular configuration illustrated is for example purposes only.

In one example embodiment, the lid 20, bottom 32 and side walls 32A-34 of the base 30 may be formed my molding to have interior and exterior walls that define a gap or space. The gap or space may contain any matter or material that increases the thermal properties of the container 10.

For insulated containers 10 such as coolers, the gap may be filled with a foam material such as polyurethane. The foam material may be inserted into the gap in one or more steps. For example, the foam may be inserted as a liquid or flowable foam that cures to form a generally rigid foam material. In its cured state, the foam material provides structural rigidity to the insulated container 10.

In other example embodiments, the gap may be filled with a gas such as air, hydrogen, argon, and the like. Liquids may also be utilized to fill the gap. For instance, liquid oxygen, liquid hydrogen and liquid argon may be used. In yet other example embodiments, the gap may be filled with a solid material such as gypsum, lime or another similar solid fill material. In still yet another example embodiment, there may be no gap and the lid 20, bottom 32 and side walls 32A-34 may be a solid or generally solid material. It is also possible to have a vacuum formed in the gap to act as an insulator.

Referring back to FIG. 1, the lip 35 of the base or body 30 may include a raised or elevated boss 37 that may extend partially or entirely about the opening of the interior compartment 36. The boss 37 may have a shape adapted to fit into or against a matching shape in the groove 24 of the lid 20. In an embodiment of the present invention having a gasket 25 positioned in the grove 24, the boss 37 may mate with the channel 24 and the gasket 25 to create a seal therebetween.

As illustrated in FIGS. 3A and 3B, one or more hinges or hinge mechanisms 40 may be used to operatively couple the lid 20 to the base or body 30 such that the lid 20 is moveable in two directions. First, the lid 20 is pivotably movable between an open position or state (see FIG. 2) and a closed position or state (see FIG. 1) with respect to the base or body 30. While in the closed state, the lid 20 extends across and selectively closes the opening of the interior compartment 36 of the base 30. Second, the lid or closure 20 is slidable between a proximate position and a distal position with respect to the base or body 30. The movement of the lid 20 in two directions enables it to pivot freely like a door when open but to evenly distribute the closing pressure necessary to seal the compartment 36 when in the closed state.

The movement of the lid 20 in at least two directions is accomplished by a hinge mechanism 40 coupling the lid 20 and body or base 30 together. In one example embodiment, the lid 20 includes a tab or leaf portion 26 formed in or coupled thereto proximate the back wall 34 of the base 30. The tab portion 26 includes a channel or bore 27, extending at least partially therethrough, that has a long axis that is generally parallel to a planar surface of the lip 35 of the back wall 34. The channel or bore 27 is adapted to receive a post or hinge pin 38 formed in or coupled to a portion of the back wall 34 proximate the tab portion 26. The hinge pin 38 may extend generally parallel to a planar surface of the lip 35 and a back surface of the boss 24. In operation, the first directional movement of the lid 20 is accomplished by the lid 20 pivoting about the hinge pin 38 while moving or traveling between the open and closed states.

As particularly illustrated in FIG. 3B, the channel or bore 27 may have a generally oblong or obround cross-sectional shape that enables the lid or closure 20 to move or slide in the second direction (slide between a proximate position and a distal position with respect to the base or body 30). The cross-section of the oblong or obround shape of the channel or bore 27 has a long axis that extends generally parallel to a back surface of the boss 37. As illustrated in FIG. 3B, the hinge pin 38 has a smaller diameter or shape than the channel or bore 27 which permits the lid 20 to move or slide along the cross-sectional long axis of the channel or bore 27.

The oblong or obround bore or channel 27 enable the lid 20 to "float" or travel along a generally vertical swing plane in a short perpendicular planal back and forth direction when in the closed state or shut position. The floating ability of the closure or lid 20 to pivot and slide with respect to the base or body enables the lid 20 to evenly distribute full perimeter sealing when the lid or closure 20 is in the closed position and the latch members 45a, 45 are coupled to the base.

In another example embodiment of the invention, the hinge pin 38 can mount in a fixed position on a portion the lid 20 and insert through an oblong hole or channel in a portion of base 30. This hinge 40 configuration also permits the lid 20 to float or travel along a generally vertical swing plane.

In either hinge configurations disclosed above, the bi-directional movement of the lid 20 enables it to "float" or rest on or above the lip 35 or boss 37 in a pre-seal state. In embodiments having a groove 24, the bi-directional movement of the lid 20 enables the lid 20 to align the lid groove 24 with the boss 37. In any of the embodiments, the pre-seal state permits the lid 20 to easily pivot or swing between the closed and open positions or states.

Figure 5B:
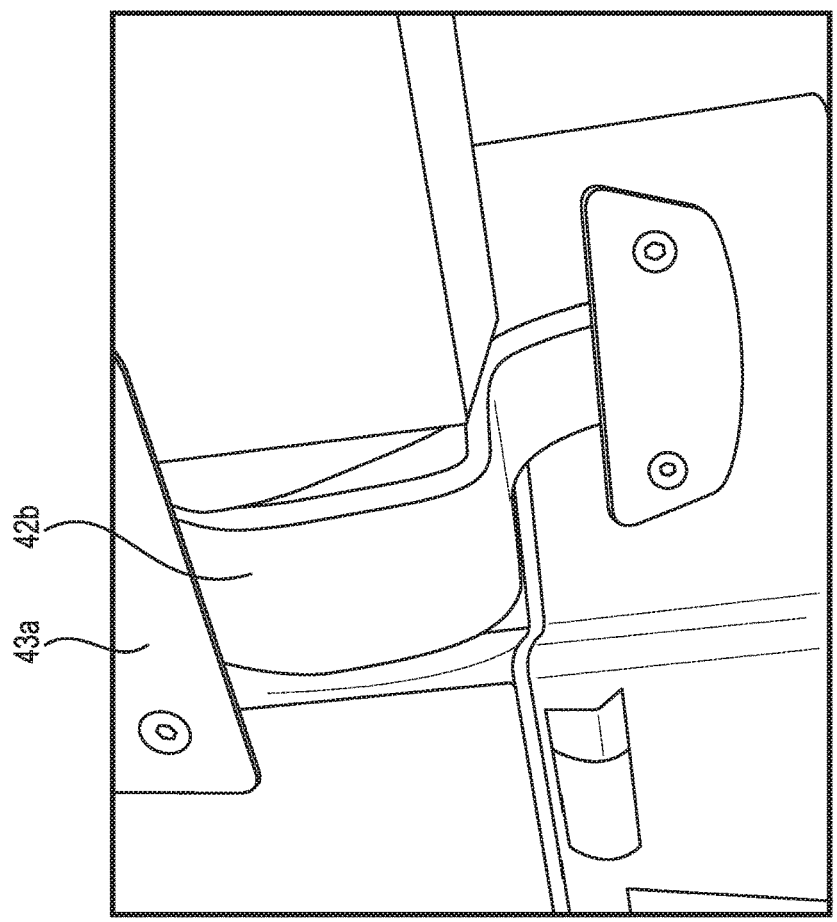
FIG. 5B shows a lid tensioning member on a lid in an open position in accordance with embodiments of the present invention
Figure 5A:
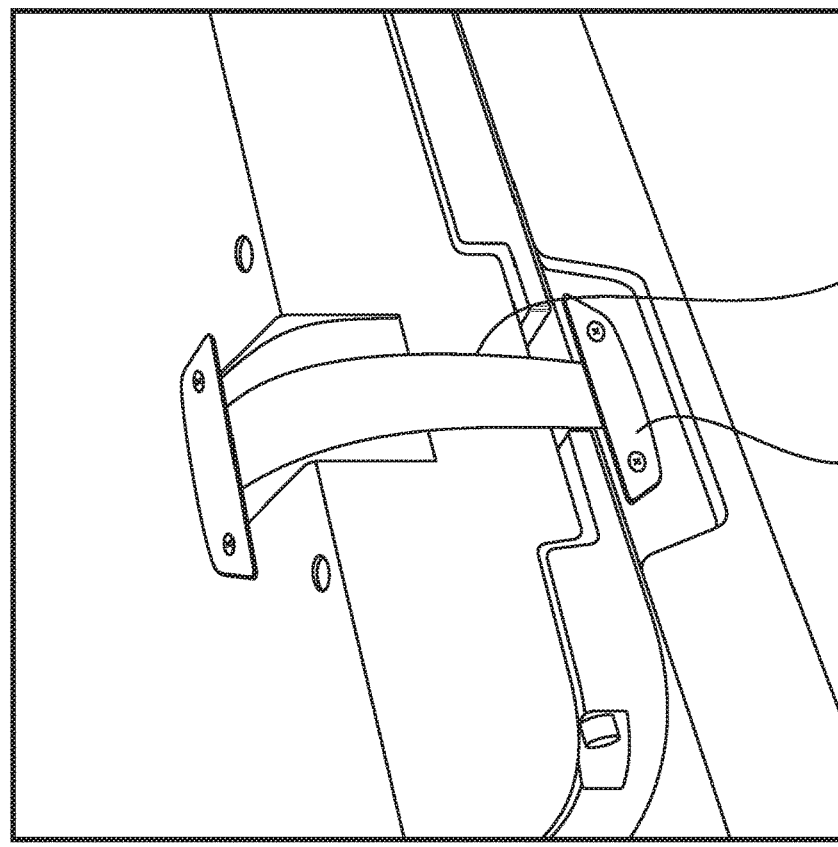
FIG. 5A shows a lid tensioning member on a lid in a closed position in accordance with embodiments of the present invention.

Once the lid 20 is placed in the pre-seal state, it may be removably secured to the base 30 in a sealed state. As illustrated in FIGS. 5A and 5B, one or more tensioning members or straps 42a, 42b are connected to and extend between a portion of the lid 20 and a portion of the back wall 34 of the base 30. As the lid 20 moves from the open to the closed position or state the tensioning members 42a, 42b applies or exerts tension to the lid 20, which provides pressure in a direction generally perpendicular to a planar surface of the lid 20. As pressure is continued to be applied to the lid 20, the boss 37 becomes seated in the groove 24 of the lid 20. In an embodiment of the invention having a gasket 25, the boss 37 may compress the gasket 25 when sealing to provide even a tighter or more secure seal. In embodiments without a boss 37 and/or groove 24 the gasket 25 may seal against the lip 35 of the base or body 30.

The tensioning members 42a, 42b may have mounting members 43a and 43b formed thereon or attached thereto that attach respective ends of the tensioning member 42a, 42b to the lid 20 and the base 30. As illustrated in FIGS. 5A and 5B, the mounting members 43a, 43b may comprise plates that can be mounted in recesses in the lid 20 or the base 30 so that the surface of the container 10 is generally unobstructed or smooth. In one example embodiment, the mounting members 43a, 43b can be removably fixed or connected to the lid 20 and the base 30 by fasteners so that they may be replaced.

In one example embodiment, the mounting point of the tensioning members 42a, 42b or plates 43a, 43b on the lid 20 may be above and outside of the hinge pin 38 so that the mounting point rotates axially around the hinge pin 38. As the lid 20 opens, the mounting point of the tensioning members 42a, 42b rotates downward, reducing the distance between the two mounting points and releases tension. As the lid 20 closes, the mounting point of the tensioning members 42a, 42b rotates axially around the hinge pin 38. The tensioning members 42a, 42b increase the distance between the two mounting points causing tension in the tensioning members 42a, 42b with pressure created in a direction between the mounting point on the back wall 34 and the outermost point where the tensioning members 42a, 42b is perpendicular with the axial rotation around the hinge pin 38.

During use, when the lid 20 is rotated toward the open state or position, the lid slides such that the hinge pin 38 is positioned in a short axis end of the bore 27 proximate the base or body 30. As the lid 20 rotates toward the closed position or state, the lid 20 is pressed onto the base or body 30 by tensioning members 45a, 45b. In the closed stated the hinge pin 38 is positioned generally proximate a short axis end of the bore 27 distal or away from the base 30.

Turning back to FIG. 1, the lid or closure 20 includes one or more latch or hook members 45a, 45b that can be used to secure the lid 20 in the closed sealed position. As particularly illustrated in the example embodiment of FIG. 1, latch or hook members 45a, 45b may be removably attached to a portion of the lid 20 and detachably securable to a portion of the base 30. The latch members 45a, 45b have a receiving portion or free ends 46a, 46b that may be formed to have a shape, such as a generally rectangular shape, with an open central portion that can receive fingers of a user operating the lid 20.

In another example embodiment, a back surface of the free ends 46a, 46b may have a generally angled hooking surface that is adapted to hook underneath a portion of the base or body 30. The body 30 may have one or more notches capable of receiving or mating with the angled hooking surface of the free ends 46a, 46b. The angled hooking surface permits a user to easily connect the lid 20 to the body 30 by moving the free end of the latch away from the body 30 until the angled hooking surface is positioned below the mating surface of the body 30. A user may then press the hooking surface into the mating surface of the body 30 while rotating the end of the free end 46a or 46b toward the body 30. Unlatching the lid 20 from the body 30 is accomplished by reversing the above process.

In other example embodiments of the invention, the latch members 45a, 45b may have notches or bulging portions along their lengths, wherein a user can adjust tension or pressure on the lid 20 by adjusting a position of a notch or bulging portion with a particular notch of the base 30.

In yet another example embodiment, the receiving portion or free ends 46a, 46b having one or more openings or holes extending therethrough can also act as a hook that hooks onto one or more protruding portions of the base 30. A pressure exerted on the lid 20 may be adjusted by positioning various holes with various protruding portions.

Use of the tensioning members 42a, 42b and the latch members 45a, 45b ensure that the proper amount of tension is exerted or applied to the lid 20. The proper amount of tension ensures that the boss 37 properly seats in the groove 24 of the lid 20. When the boss 37 is seated correctly it ensures that air and liquid in the container 10 is prevented from escaping or being exchanged with ambient air.

The tensioning members 42a, 42b and the latch members 45a, 45b may comprise any generally elastic material such as rubber, silicon, or the like. The elastic properties of the tensioning members 42a, 42b and the latch members 45a, 45b provide a durable connection while also permitting adjustable lid 20 tension. Other materials may also be used and the above description should not be considered limiting.

The length, width, and thickness of the tensioning members 42a, 42b and the latch members 45a, 45b may vary depending upon the desired tensioning and latching properties. For example, shorter and thicker tensioning members 42a, 42b or latch members 45a, 45b may cause an increase in lid 20 tension. In another example embodiments, a thickness of the tensioning members 42a, 42b and the latch members 45a, 45b may vary along their length, thereby creating varying amounts of tension depending upon the position of the lid 20. For example, tensioning members 42a, 42b having a thicker central section or portion may have or impart an increasing tension on the lid 20 as the lid 20 moves from the open position to the closed position. Other configurations are also possible and should be considered to be within the spirit and the scope of the invention.

The hinge and latch mechanism of the present invention enables a lid to move freely between an open position or state and a closed pre-sealed position or state. Its advantages permit it to be used with any container having a door, lid, or similar closure. For example, refrigerators, freezers, trunks, transport or shipping containers, and the like.

Referring to FIG. 1, the base or body 30 may include a drain opening or hole 47 formed in one of the side walls 32a, 32b, front wall 33, or back wall 34 to permit a user to empty a liquid from the interior compartment 36 of the container 10. Preferably, the drain hole 47 is positioned proximate to the bottom 31 of the container 10 to ensure easy emptying of any liquid contents. A drain plug 50 may be used to selective close the drain hole 47. The drain plug 50 may be threaded or pressure fitted into the drain hole 47. To drain the container 10 a user merely unthreads or pulls the drain plug 50 from the drain hole 47.

Figure 6:
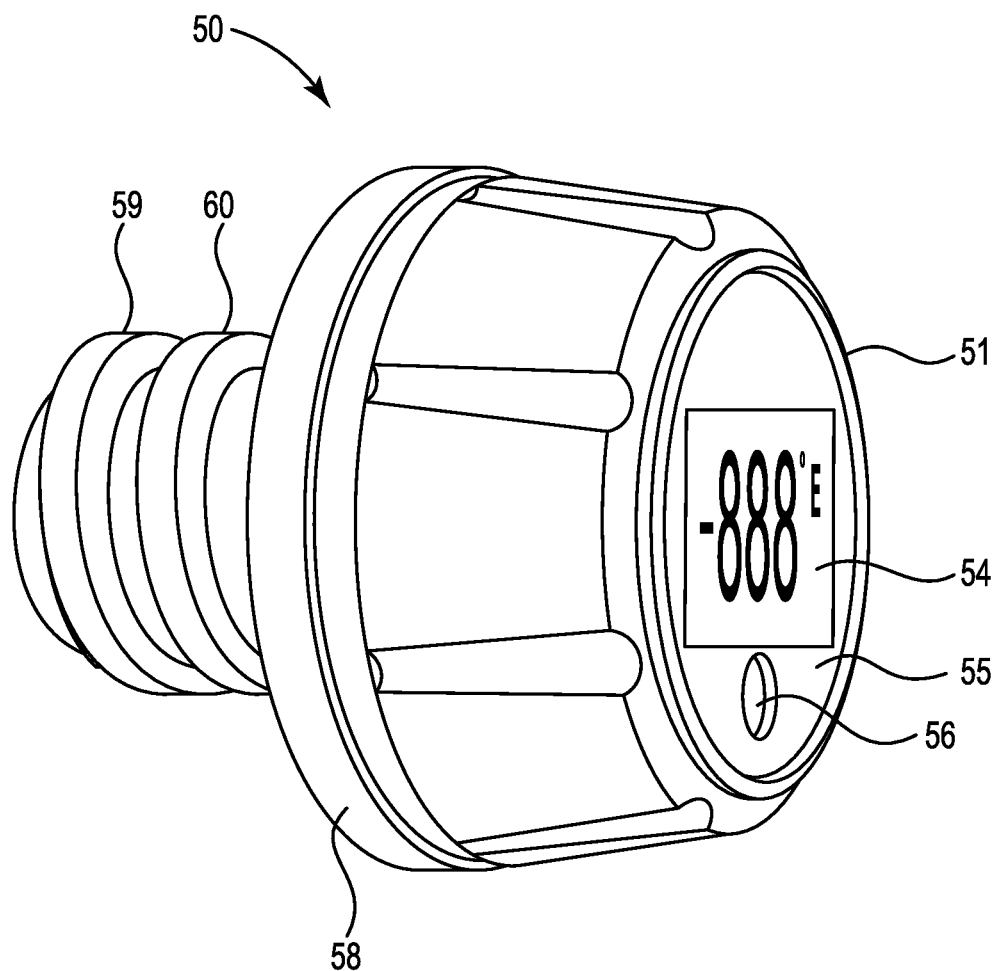
FIG. 6 shows a perspective view of a temperature monitor in accordance with embodiments of the present invention.
Figure 7:
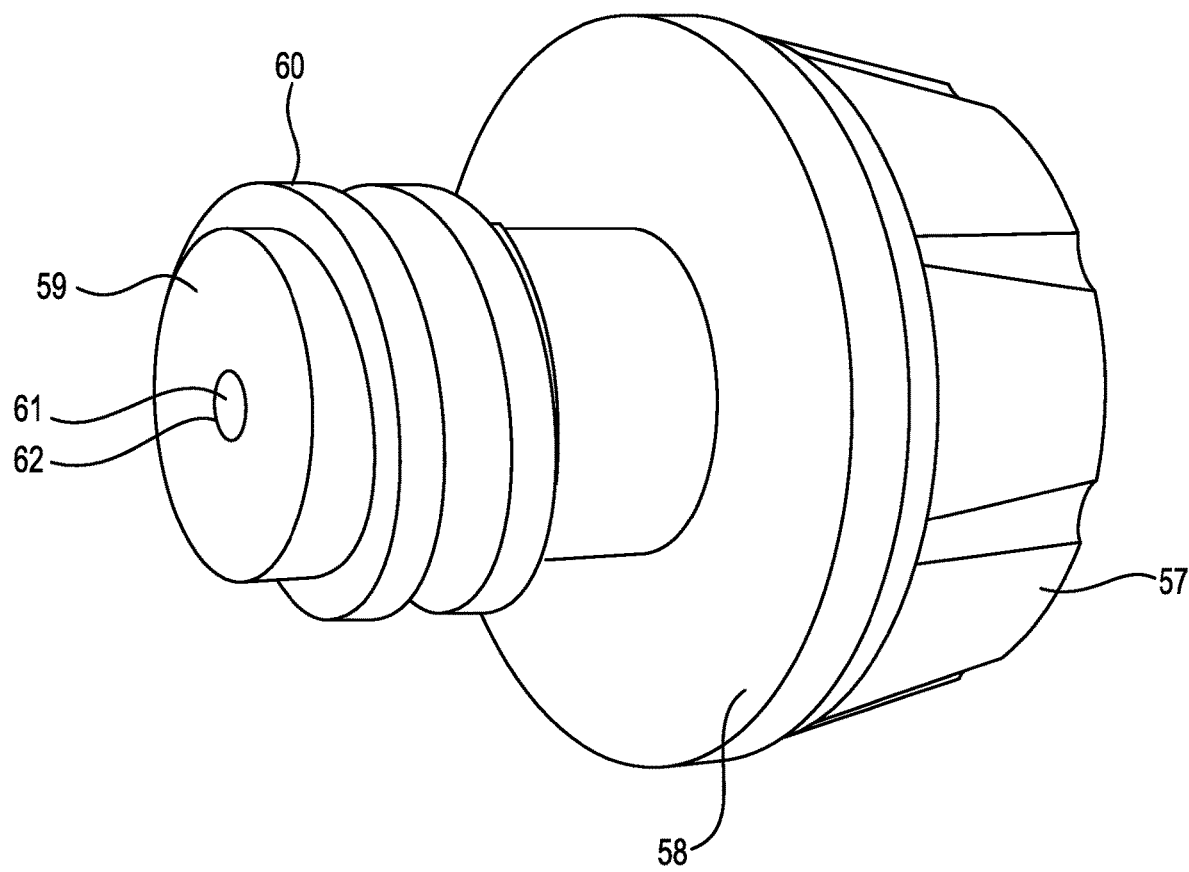
FIG. 7 shows a stem of a temperature monitor in accordance with embodiments of the present invention.
Figure 8:
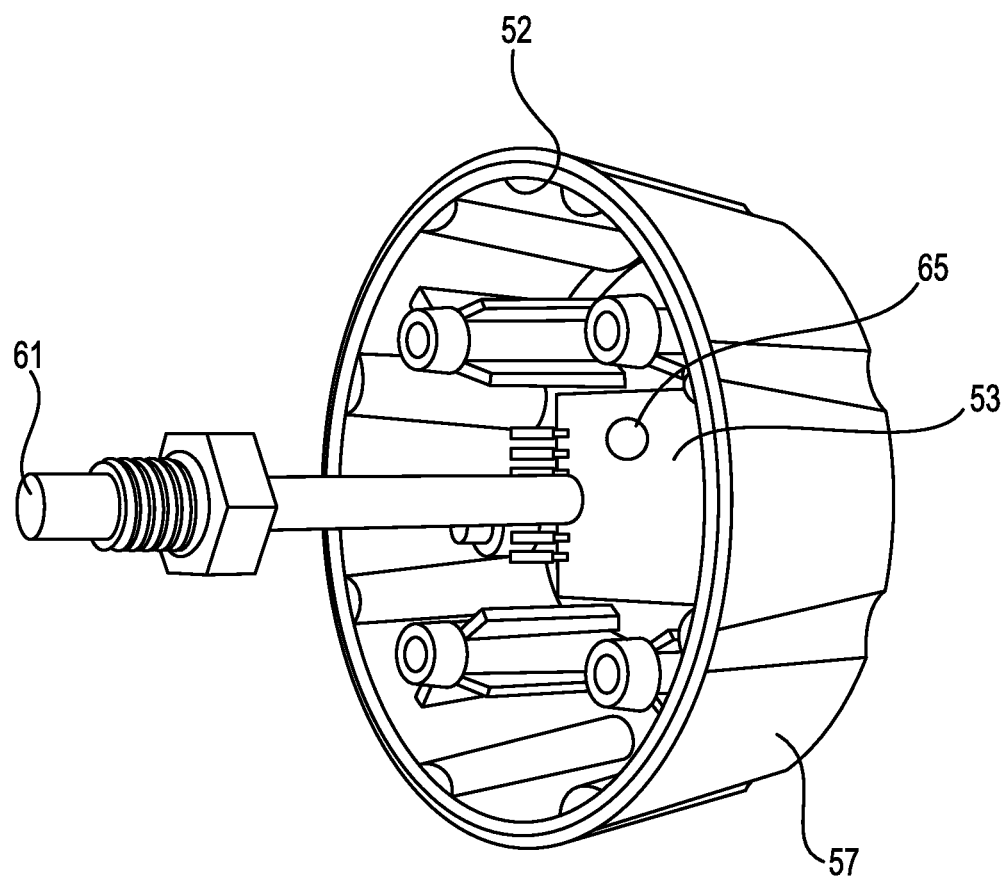
FIG. 8 shows an interior of the temperature monitor of FIG. 6.

In one example embodiment, as illustrated in FIGS. 6-8, the drain plug 50 may comprise a monitor or sensor. For example, drain plug 50 may comprise a temperature sensor to monitor an internal air or liquid temperature of the compartment 36 of container 10 without having to open the lid 20.

The drain plug 50 may also comprise a pressure sensor to monitor the amount of pressure in the interior 36 of the container 10. In another example embodiment, the drain plug 50 may comprise a tilt sensor to warn a user if the container exceeds a predetermined tilt axis. In still another embodiment, the drain plug 50 may comprise a proximity sensor that warns a user if their container 10 exceeds a predetermined distance from them or from another device such as a smart phone. Any sensor and warning device may be used and incorporated into the drain plug 50.

As illustrated in FIGS. 6-8, the drain plug 50 may comprise a housing portion 51 having an interior or cavity 52 designed to hold or store sensor circuitry 53. The sensor circuitry 53 includes a display 54 that is visible through a front wall 55 of the drain plug 50. The display 54 may be a digital display but vintage analog displays may also be used. Any type of digital display may be used. For example, a liquid crystal display, an organic light emitting diode display, or any similar type of digital display.

The sensor circuitry 53 may also include a control or switch 56 operatively coupled thereto that may be accessible through the front wall 55 of the housing portion 51. The control 56 may be a depressible button, sliding switch, touch sensor, capacitive touch sensor, and the like. In another embodiment, the housing portion 51 itself may act as a control. For example, a user may depress or move the housing portion 51, axially or rotationally to control the display 54 readout.

The control 56 may be used to permit a user to select between various display options such as, power on/off, temperature in Celsius or Fahrenheit, interior/exterior temperature, proximity to external device, time, and similar monitoring type parameters.

In one example embodiment of the invention, a wireless device such as a smart phone or watch may be able to wirelessly communicate with the sensor circuitry 53 to permit a user to monitor the state of their container 10. The wireless device may also be used to permit the sensor circuitry 53 to warn a user about a particular condition or state of their container 10.

As illustrated in FIG. 6, the housing portion 51 may include a side wall 57 extending away from the front wall 55, wherein the side wall 57 defines or creates the cavity 52. The side wall 57 may be textured or formed to have features that permit a user to more easily grasp the drain plug 50 during placement in or removal from the drain hole 47.

As particularly illustrated in FIG. 7, the cavity or interior 52 of the housing portion 51 may be closed by a wall, a seal, or a washer 58 that extends across a lip of the side wall 57. The washer 58 acts to prevent any liquid in the container 10 from draining out of the drain hole 47 when the drain plug 50 is in place.

The drain plug 50 may also include a stem portion 59 for securing the drain plug 50 in the drain hole 47. As illustrated in FIG. 7, the stem portion 59 extends axially away from the housing portion 51 and the washer 58. The stem portion 59 may have a threaded exterior that is designed to mate with a threaded interior of the drain hole 47. In another embodiment, one or more gasket members 60 may be disposed on or positioned about the stem portion 59. The gasket members 60 are adapted to mate with a side of the drain hole 47 to seal and prevent any liquid from escaping from the container 10 until the drain plug 50 is removed.

As particularly illustrated in FIG. 8, a sensor 61, in operative communication with the sensor circuitry 53, is positioned in the stem portion 59. The sensor 61 may be connected to the sensor circuitry 53 by wires traveling through the stem portion 59 or through a conduit extending through the stem portion 59. In another example embodiment, the sensor 51 may be in wireless communication with the sensor circuitry 53 for example through a wireless network or through a Bluetooth connection.

As illustrated in FIG. 7, the sensor 61 is positioned in a hole or opening 62 extending in an end of the stem portion 59. The position of the sensor 61 in the end of the stem portion 59 permits it to engage or come into contact with the air or liquid contained in the interior compartment 36 of the container 10. The proximity of the sensor 61 to the interior 36 provide a user with an accurate interior sensor reading.

In one embodiment of the present invention, a gasket or seal may be mounted about the sensor 61 or positioned in the stem portion 59 to prevent liquid from entering the stem portion 59 and coming into contact with the sensor circuitry 53. In another example embodiment of the present invention, the sensor does not extend through an opening 62 but rather is able to obtain sensor readings through a wall of the stem portion 59.

The sensor circuitry 53 and display 54 may be powered by a battery 65 operatively positioned in the interior or cavity 52 of the drain plug. In order to access the cavity 52, for example to change the battery 65, the stem portion 59 may be unthreaded from the sensor 61 or conduit and the washer 58 removed. If a wall is utilized behind the washer 58 it may be removed by removing fasteners, unclipping or unscrewing. Once the washer 58 and/or wall is removed the interior 52 will be accessible. Once the battery 65 is replaced the wall, washer 58, and stem portion 59 may be reattached and the drain plug 50 re-inserted.

In an example embodiment of the invention, the drain plug 50 may also act as a sensor or monitor for any number of things. For example, the drain plug 50 may be removed from the drain hole 47 and used to record a temperature of food being prepared. In another example embodiment, the sensor 61 may be used to record or read a temperature of a surface such as a fry pan or a bicycle seat. Other uses are also possible and they should be considered to be within the spirit and scope of the invention.

The drain plug 50 of the present invention is designed to be used in many different containers. For instance, the stem portion 59 of the drain plug 50 may be inserted into the drain hole of other coolers to permit a user to be able to monitor the temperature of different containers. The drain plug 50 can also be placed inside a cooler or container not having a drain plug. The drain plug 50 can then be removed to read the temperature.

The container 10 may also include pressure regulator mechanism 70 to regulate a pressure in its interior compartment 36. The pressure regulator 70 can automatically or manually adjust a pressure of the interior compartment 36 to reduce or prevent a pressure differential between the container 10 and the external environment. When a pressure differential is present it can be difficult for a user to open the lid 20 due to the creation of an internal vacuum. Generally equalizing the pressure in the interior compartment 36 with the external environment reduces the differential pressure, thereby reducing the vacuum and making opening the lid 20 less difficult.

As illustrated in FIGS. 9A-14, the pressure regulator 70 may be mounted in one of the walls 32A-34 or the lid 20 of the container 10 to create a port 71 between the interior compartment 36 and the external environment. The pressure regulator 70 is designed to selectively open and close the port 71 to maintain an equal or preferred pressure differential.

Figure 9A:
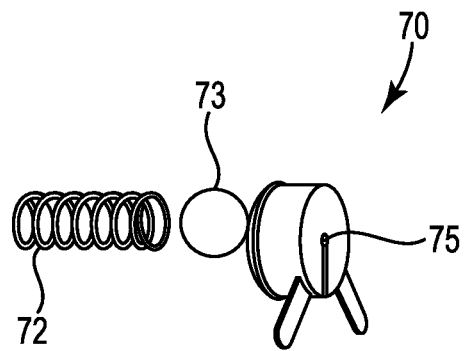
FIGS. 9A and 9B show perspective expanded views of a pressure regulator of an insulated container in accordance with embodiments of the present invention.
Figure 9B:
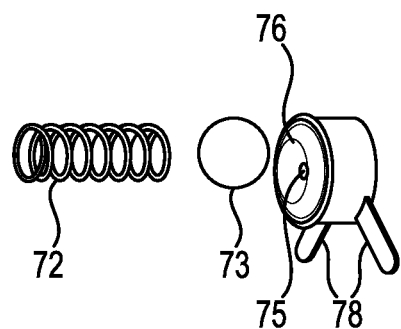

As depicted in FIGS. 9A, 9B, the pressure regulator 70 can include a pressure differential check valve comprising a biasing member or spring 72 and a ball 73 operatively positioned or disposed in the port 71. The spring 72 may be positioned generally perpendicular to a planar surface of the wall in which it is mounted. The spring 72 may also be positioned against a rest formed by an inner surface of an inner wall of the container 10.

The spring 72 can be selected for its compressive properties to permit a certain maximum amount of pressure differential between the container 10 and the external environment. Having a pressure differential ensures that the lid 20 is sealed with the base 30. The pressure differential sealing is beneficial to maintain the thermal properties of the container 10. The stronger the compressive properties of the spring 72 the higher the pressure differential required to move the ball 73 and expose the port 71.

In one example embodiment of the invention, springs 72 with varying compressive forces may be provided to permit a user to select an amount of permitted pressure differential. This may be important for certain users, such as the elderly or others with disabilities, that need to have a lid 20 that is more easily opened. More compressive springs 72 may be advantages for users that are traveling with their containers 10 and need to ensure that the lid 20 does not become unsealed from the base or body 30.

Figure 10:
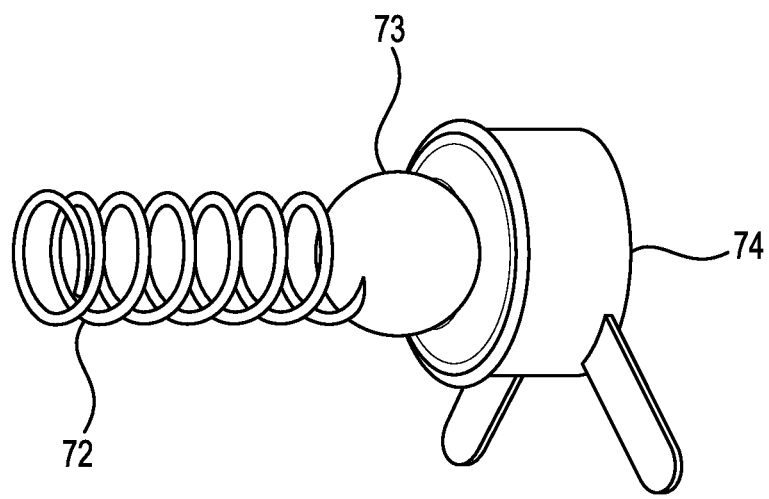
FIG. 10 shows a side view of a pressure regulator of the container in accordance with embodiments of the present invention.

As particularly illustrated in FIGS. 9A, 9B and FIG. 10, the ball 73 may be positioned between the spring 72 and a seat 74 to control the flow of air between the interior compartment 36 of the container 10 and the external environment. As illustrated in FIGS. 9A, 9B, the seat 74 can have one or more air passages 75 extending therethrough to permit the external air to pass through it when the ball 73 is biased away from it due to a vacuum in the container 10.

In one example embodiment, the seat 74 may have a generally concave surface 76 that is adapted to mate with a curvature of the ball 73. The concave surface 76 creates a better seal between the ball 73 and the seat 74 when the pressure regulator 70 is in the closed position. Although a particular ball 73 and seat 74 configuration is described it should not be considered limiting and other configurations, such as a disk instead of a ball, may also be employed. Other configurations should also be considered to be within the spirit and scope of the invention.

In FIG. 10, the pressure regulator 70 is depicted in a closed position with the ball 73 biased toward or engaged with the seat 74. An open position of the pressure regulator 70 is created when a vacuum is created in the interior compartment 36 of the container 10 due to a pressure differential. When a pressure differential is created the vacuum in the container 10 causes the ball 73 toward the interior compartment 36 and against the spring 72. As the ball 73 moves toward the interior compartment 36 it moves away from the seat 74 and exposes the air passage 75 permitting air to flow through the port 71 and into the interior compartment 36. The flow of air into the interior compartment 36 equalizes the pressure differential and reduces the vacuum. With the vacuum reduced a user may more easily open the lid 20. Once the preferred pressure differential is obtained the ball 73 will be automatically biased by the spring 72 against the seat 74 blocking the port 71.

Figure 11:
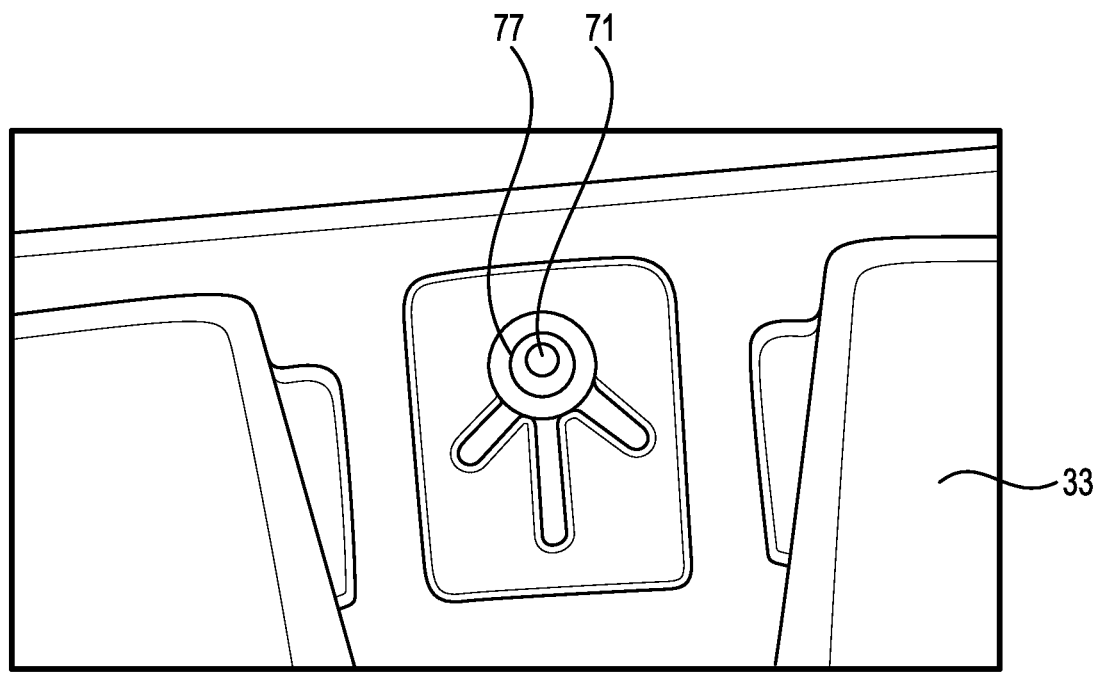
FIG. 11 shows a front view of pressure regulating port in the container in accordance with embodiments of the present invention.
Figure 13:
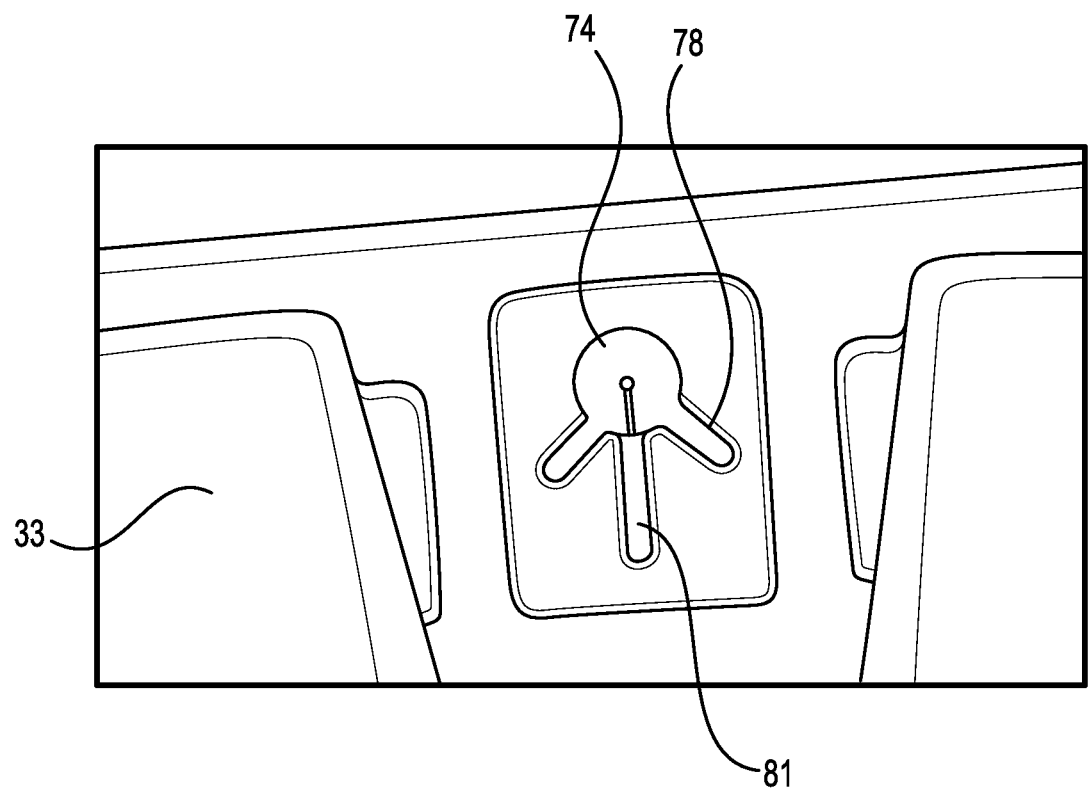
FIG. 13 shows a front view of pressure regulating port and pressure regulator in the container in accordance with embodiments of the present invention.

As illustrated in FIGS. 11 and 13, the seat 74 may be removably positioned in a recess 77 formed in a wall of the container 10. The spring 72 and ball 73 may be replaced by removing the seat 74. The seat 74 may include one or more arms 78 formed thereon or attached thereto that assists a user in in properly placing the seat 74 in the recess. The arms 78 may also be used to assist a user in removing the seat 74 from the recess 77.

Figure 12:
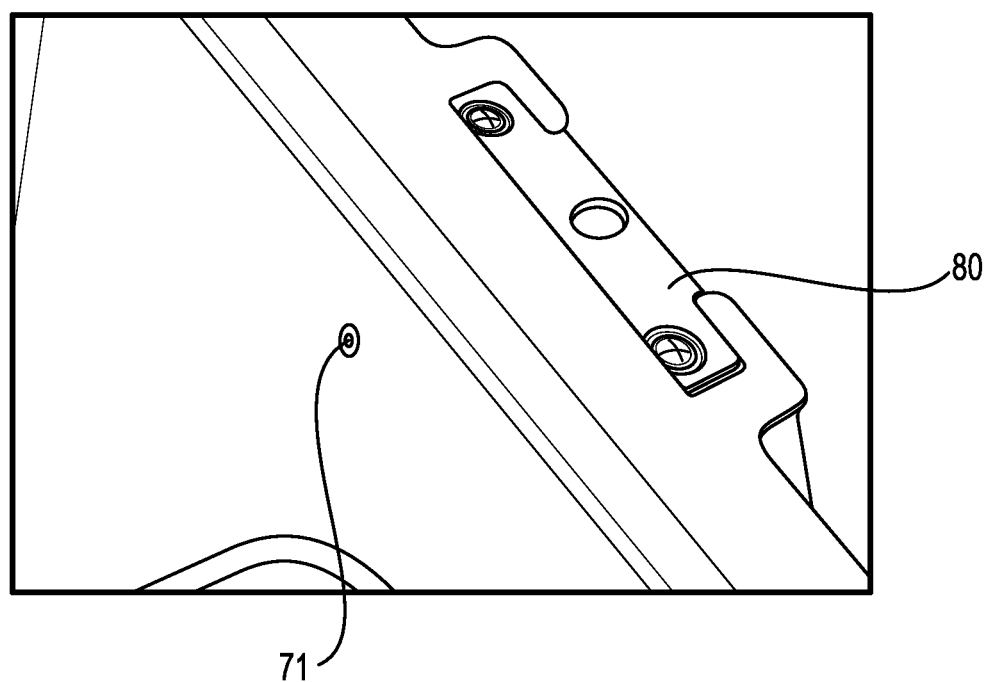
FIG. 12 shows an air passage to control interior pressure of a container in accordance with embodiments of the present invention.
Figure 14:
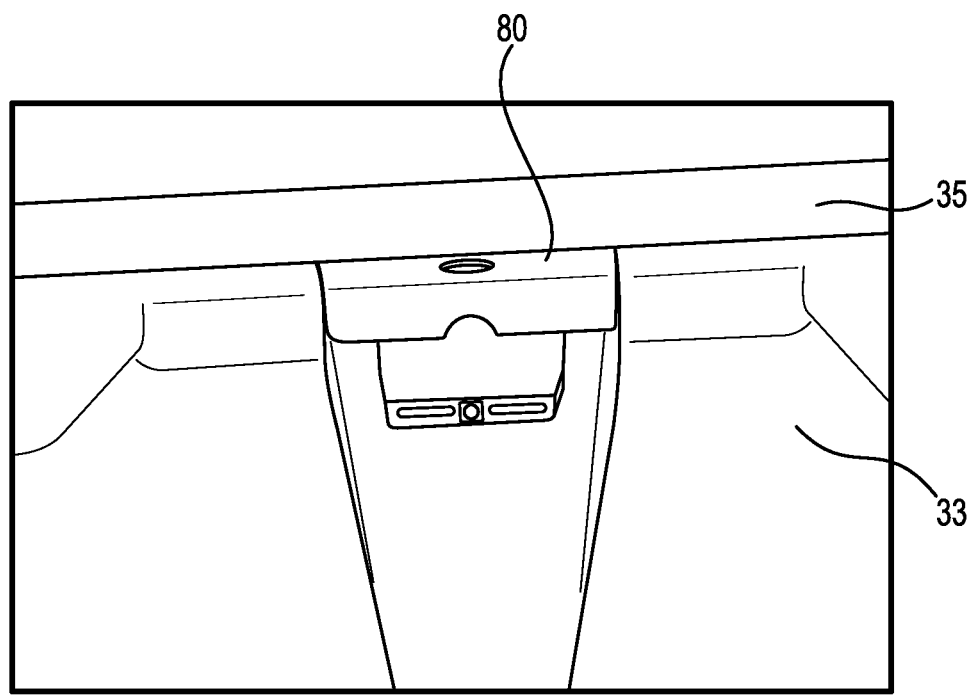
FIG. 14 shows a front view of the container having an accessory in accordance with embodiments of the present invention.

Turning now to FIGS. 2, 12, and 14, an accessory, such as a bottle opener 80 may be removably mounted on the container 12 to permit a user to open a bottle without the need for a separate bottle opener. The bottle opener 80 may be mounted on the container 10 such that the pressure regulator 70 is hidden by it. In this particular embodiment, an air channel 81 may be formed in the container behind the bottle opener 80 to permit air to more easily flow behind it and into the air passage 75 of the seat 74.

As illustrated in FIG. 9A, a front surface of the seat 74 that will face the accessory 80 when assembled, may include an air groove channel 79 that is in fluid communication with the air passage 75 of the seat 74 and the air channel 81 of the container 10. The air channels 79, 81, and the air passage 75 ensures that air is able to flow into the interior compartment 36 of the container 10.

In yet another embodiment of the invention, feet 85 may be mounted on the bottom wall 31 of the container 10. The feet 85 may be removably fixed to the bottom wall 31 with one or more fasteners to permit the feet 85 to be replaced. In one example embodiment, the feet 85 may have two or more sides that can be interchangeably used depending upon a user's needs. For example, the feet 85 may have a rubber surface or side that resists sliding of the container 10 on a surface.

In another example, the feet 85 may have wheels or a generally hard or slippery surface that permits the container 10 to be more easily moved. It is also possible to have feet 85 with magnetic properties that permit the container 10 to be magnetically coupled to a truck bed or other magnetic surface in order to prevent the container 10 from tipping over. Other materials, devices, and coatings may also be employed.

The container 10 may also one or more handles to assist a user in carrying or moving the container 10. In one example embodiment, the handles may be formed in one or more walls of the base 30. In another embodiment, the handles may be removably mounted to the container 10. The handles may be fixed or pivotal and may having any particular length or shape that permits the container 10 to be more easily moved or carried.

The interior compartment 36 of the container 10 may have one or more dividers removably insertable into the interior compartment 36 to divide the container 10 into individual sections. The dividers may rest in one or more slits formed in any of the inner surfaces of the side walls 32A, 32B, front wall 33, back wall 34, bottom 31, or lid 20. The dividers may be constructed from a durable, generally planar, material such as a plastic or metal that permits the divider to also act as a cutting board or surface.

In another embodiment of the invention, a carrier or basket may be removably positionable in the interior compartment 36 store goods above or away from any liquids in the bottom of the container 10. The carrier may be ideally suited for goods that ideally kept dry. For instance, fresh vegetables and fruits can be kept cool and dry in the carrier. The carrier may comprise a wire basket that extends across and rests upon a portion of the lip 35 of the container 10.

Although the invention has been explained in relation to its preferred embodiment, it is to be understood that many other possible modifications and variations can be made without departing from the spirit and scope of the invention.

Any patents, patent applications, and publications cited herein are hereby incorporated by reference in their entirety as if individually incorporated, and include those references incorporated within the identified patents, patent applications and publications.

Obviously, numerous modifications and variations of the present invention are possible in light of the teachings herein. It is therefore to be understood that within the scope of the appended claims, the invention may be practiced other than as specifically described herein.

What is claimed is:

1. A container, comprising:
    a body having a bottom, a plurality of side walls, a front wall and a back wall, wherein the bottom and the walls form a compartment for storing contents;
    at least one closure pivotally coupled to a portion of the body, the closure having a top surface, a bottom surface and a perimeter edge for selectively enclosing or sealing the compartment of the body, wherein the at least one closure is further slidably movable between a proximate position and distal position with respect to the body; and
    at least one hinge tensioning member extending between a portion of the body and a portion of the closure for applying full perimeter tension to the closure in the closed position, wherein the at least one hinge tensioning member is configured to increase a generally downwardly exerting pressure on the closure as the closure moves from the open position to the closed position.

2. The container of claim 1, further comprising at least one latch member removably coupled to the closure, the at least one latch member having a free end having an opening adapted for receiving at least one finger of a user operating the closure, wherein a portion of the at least one latch member is selectively connectable to a portion of the body.

3. The container of claim 2, wherein the at least one latch member has a generally angled rear surface proximate the free end that is adapted for mating with a portion of the body.

4. The container of claim 1, wherein the at least one hinge tensioning member is composed of an elastomeric material such that the at least one hinge tensioning member is adapted to increase a generally downwardly exerting pressure on the closure as the closure rotates toward the closed position.

5. The container of claim 1, further comprising a hinge member extending through at least a portion of the closure and through at least a portion of the body to operatively couple the closure and body together.

6. The container of claim 5, wherein a portion of the hinge member is positioned in an obround bore of the closure that is axially aligned with a bore extending into the body, wherein the obround bore permits the closure to slidably move between a proximate position and a distal position with respect to the body.

7. The container of claim 1, further comprising a sensor having a stem removably insertable in a drain hole to permit a user to monitor a condition of the compartment.

8. The container of claim 7, wherein the sensor further comprises a digital display configured for displaying the condition being monitored.

9. The container of claim 7, wherein the condition being monitored is a temperature, a pressure, or a humidity of the compartment; or a location of the container.

10. The container of claim 7, wherein the sensor is configured to be removable from the container to monitor a condition separate from the container.

11. The container of claim 1, further comprising a pressure regulator removably coupled to a portion of the container, the pressure regulator being configured to automatically control a maximum amount of a vacuum in the compartment.

12. The container of claim 11, wherein the pressure regulator comprises a spring, ball check, and a seat removably positioned in a port extending through a portion of the container, wherein the ball check is automatically movable toward the spring to reduce the vacuum in the compartment to the predetermined maximum and whereby the spring moves the ball check against the seat which closes the port when the maximum vacuum is achieved.

* * * * *